United States Patent [19]
Kaiser et al.

[11] 3,761,563
[45] Sept. 25, 1973

[54] REACTING METAL OXIDES WITH A SULFATE AND PYROSULFATE MIXTURE

[75] Inventors: Günter Kaiser; Erich Zimmer, both of Julich, Germany

[73] Assignee: Kernforschusanlage Julich Gesellschaft mit beschrankter Haftung, Julich, Germany

[22] Filed: Apr. 20, 1971

[21] Appl. No.: 135,802

[30] Foreign Application Priority Data
Apr. 21, 1970 Germany.................. P 20 18 953.1

[52] U.S. Cl.......................... 423/5, 423/12, 423/57, 423/84, 423/85, 423/146, 252/301.1 R
[51] Int. Cl.............................................. C01g 56/00
[58] Field of Search................................ 23/325, 21; 252/301.1 R; 423/5, 12, 57, 84, 85, 146

[56] References Cited
UNITED STATES PATENTS

| | | | |
|---|---|---|---|
| 3,082,068 | 3/1963 | Schlecht et al. | 23/21 X |
| 3,399,977 | 9/1968 | Wurm et al. | 23/325 |

Primary Examiner—Leland A. Sebastian
Attorney—Edwin E. Greigg

[57] ABSTRACT

The invention relates to a process for converting oxides to sulfates. The contemplated oxides are slowly soluble or insoluble in acids and/or lyes, particularly the oxides found in nuclear fuel and/or breeder material. The oxides are mixed with a sulfate and a disulfate (pyrosulfate) and heated to between about 650° C and 800° C for a comparatively short time. The amount of disulfate should be at least stoichiometric.

6 Claims, No Drawings

REACTING METAL OXIDES WITH A SULFATE AND PYROSULFATE MIXTURE

The invention relates to a process for decomposing oxidic compounds which are slowly soluble or insoluble in acids and/or lyes, more especially metallic compounds such as $ZrO_2$, $ThO_2$ or the like, mixed oxides such as (Th,U) oxide, (U,Pu) oxide or the like, and compounds having the composition $Me^I O \cdot Me^{II}_2 O_3$, wherein $Me^I$ is a bivalent metal and $Me^{II}$ is a trivalent metal, such as $FeO \cdot Cr_2O_3$, $FeO \cdot Fe_2O_3$ or the like, and $Me^I O \cdot Me^{II} O_2$, wherein $Me^I$ is a bivalent metal and $Me^{II}$ is a tetravalent metal, such as $CaTiO_3$ or the like, and other oxidic compounds having two or more metals, or in some cases also non-metals, as compound constituents.

BACKGROUND OF THE INVENTION

Processes for decomposing oxidic compounds are employed in various technical fields, for example, for processing oxide ores, for reprocessing of spent nuclear fuel, and for recovery of fissile and fertile material from waste resulting from the manufacture of nuclear fuel, for example, in the manufacture of oxide particles.

A number of processes for decomposing oxidic compounds are at present known. Thus, a method for decomposing naturally occuring zirconia has already been proposed, whereby the zirconia is first treated with boiling hydrochloric acid in order to remove impurities. The resulting reaction mixture is then fumed off with boiling sulphuric acid. By way of example of this teaching, see the following: H. Holness, Metallurgia (Manchester), Vol. 39, 1948, page 117; H. Trapp, Metallboerse, Vol. 21, 1931, pages 1516–7 and 1565; F. L. Clark, British Pat. Specification No. 401,756; German Pat. Specification No. 516,852; British Pat. Specification No. 291,004; and French Pat. Specification No. 654,465.

Heretofore, endeavors also have been made to decompose zirconium oxide by means of alkali disulphate or alkali hydrogen sulphate, which forms disulphate (pyrosulfate) on melting. See for example: J. W. Marden, M. N. Rich, Bulletin Bureau of Mines No. 186 (1921) 8, 48; L. Weiss, R. Lehmann, Z. Anorg. Chem. 65, (1910) 178/227, 190; J. H. De Boer, A. E. Van Arkel, Z. Anorg. Chem.141, (1924) 284/8; J. H. De Boer, Ind. Eng. Chem. 19 (1927) 1256/9. However, the prior art discloses that the amount of melt required was very high. It amounted to five to 20 times the quantity of weight of ore. In addition, the reaction times were very long.

It is also known that thorium oxide can be converted into water-soluble thorium sulphate by reaction with hydrogen sulphate. For example, see T. sollmann, E. D. Brown, Am. J. Physiol. 18, 1907, pages 426/56.

Another method of decomposing oxidic compounds, which is employed for nuclear fuel particles, consisting of mixed oxides of thorium and uranium, resides in employing for the dissolution concentrated nitric acid, to which fluoride ions are added as catalyst. However, even this step involves considerable expenditure of time, especially when the fuel material is present in the form of highly sintered mixed oxide particles. Generally, about 12 hours, and in special cases even up to 75 hours, were necessary. (See the report of Oak Ridge National Laboratory TM–867). In order to obviate this disadvantage, alkali disulphate was employed as decomposing agent in accordance with an unpublished proposal. In this case, the ratio by weight of disulphate to the fuel material to be decomposed is about 5:1. A considerable reduction of the reaction time is thereby achieved. However, in order to decompose the reaction material quantitatively, it was necessary for the oxide material to be divided into small quantities which were added in portions to the molten disulphate.

Consequently, all the known processes have the disadvantage that more or less long reaction times are required. A further disadvantage resides in that, in the hitherto known processes for the decomposition of oxidic compounds in which the decomposition takes place by means of disulphate, the quantity by weight of disulphate employed is disproportionately high in relation to the quantity by weight of material to be decomposed. In addition, pyrolysis of disulphate will cause considerable losses of this reagent, because $SO_3$ escapes from the reaction vessel without having been utilized. If hydrogen sulphate is employed for the decomposition, the disulphate must first be formed in the reaction vessel from the starting product present as hydrogen sulphate by splitting-off of water before the decomposition reaction can commence.

THE INVENTION

The primary object of the invention is therefore to provide a process for decomposing oxidic compounds, more especially fuel materials for thorium-uranium and uranium-plutonium reactors, which is considerably more economical than the hitherto known processes in regard to the time expended in carrying it out and reagent losses which cannot be avoided.

To solve this problem, the decomposition is carried out by a process of the aforesaid kind at a temperature between about 650° C and 800° C by means of a mixture consisting of disulphate and sulphate, the quantity of disulphate having to correspond at least to the stoichiometric quantity, in order to convert the oxides into sulphates. It is very desirable for the decomposition to be carried out by means of an excess of disulphate, but this excess should preferably not exceed 50 percent of the stoichiometric quantity.

It is advantageous to employ alkali metal and/or ammonium disulphates and sulphates known per se. In addition, it is advantageous to close off the reaction vessel by means of a wash bottle in order to obtain in the vessel a pressure of reaction gases in excess of atmospheric pressure.

To carry out the method of this invention as economically as possible, the amount of sulphate to be charged to the reaction mixture is determined in each individual case by first converting a sample of oxides to sulphates by pure disulphate. Towards the end of the conversion process the ratio between metal irons and sulphate ions is determined by, for instance, dissolving the melt or a portion thereof in water and titrating the obtained acid. It can then by simple calculation be ascertained how much sulphate has been formed by pyrolysis of the disulphate. Thus, the most economical amount of sulphate to be used in the sulphate-disulphate mixture can be ascertained.

By application of the process according to the invention, it is ensured that metallic oxides, metallic mixed oxides and compounds of the general composition $Me^I O \cdot Me^{II}_2 O_3$, in which $Me^I$ is a bivalent metal and $Me^{II}$ is a trivalent metal, as well as compounds of the composition $Me^I O \cdot Me^{II} O_2$, in which $Me^I$ is a bivalent metal and $Me^{II}$ is a tetravalent metal, and similar oxidic compounds comprising two or more metals, and optionally also non-metals, as compound constituents, are quantitatively decomposed in a short time. A further great advantage of the process according to the invention resides in that the quantity of disulphate required to carry out the process is considerably smaller than in the case of the hitherto known processes in which only pure disulphate or hydrogen sulphate has been employed. A further advantage resides in that the sulphate employed as addition in the process according to the invention can be recovered from the aqueous solution of the melt, for example, by evaporation of this solution after separation of the element to be reclaimed from the decomposed compound. Finally, the difficulties existing in the hitherto known processes in regard to the removal of waste gases formed during the decomposition reaction, and the resultant corrosion effects are considerably reduced by the process according to the invention.

EXAMPLE 1

1 kg zirconia, which was first substantially freed from impurities by boiling with concentrated hydrochloric acid, was heated to about 750° C together with 6 kg of potassium disulphate and 1.4 kg of potassium sulphate in a quartz crucible. In order to reduce the escape of gaseous sulphur trioxide the reaction vessel was closed off by means of a wash bottle filled with inert liquid. As inert liquid a hydrocarbon mixture having a boiling point about 200° C was employed. About 30 minutes after the reaction temperature had been reached, the decomposition was complete. Thereafter, the melt was dissolved in water and the zirconium was precipitated in a manner known per se as a hydrated oxide by the addition of an aqueous ammonia solution. A form of zirconium oxide which is soluble in acids was then produced from this hydrated oxide by drying.

EXAMPLE 2

For the decomposition of thorium-uranium mixed oxides, 1 kg of thorium-uranium mixed oxide nuclear fuel particles was first mechanically or chemically freed from structural and coating materials by one of the known methods. Thereafter, the nuclear fuel was introduced into a quartz reaction vessel together with 3 kg of potassium disulphate and 1.5 kg of $K_2SO_4$ and heated in an oven to a temperature substantially between 750° and 800°C. Instead of a quartz reaction vessel, it is of course possible to employ a platinum reaction vessel. In order to reduce the escape of gaseous sulphur trioxide the reaction vessel was closed off by means of a wash bottle filled with inert liquid. As inert liquid a hydrocarbon mixture having a boiling point above 200° C was employed. It was found that the reaction was complete about 30 minutes after the reaction temperature had been reached. Thereafter, the liquid melt was drained out of the reaction vessel in conventional manner by opening the freeze valve employed and dissolved in water.

Of course, it is alternatively possible to employ a siphon system or any other known means. The further processing of the reaction material may take place, for example, by first so concentrating the solution that the thorium present in solution precipitates as a sparingly soluble double salt of thorium sulphate and potassium sulphate, whereafter the uranium is extracted from the residual solution with tributyl phosphate in a further process step. That which is claimed is:

1. A process for decomposing oxidic compounds selected from the group consisting of $ZrO_2$, $ThO_2$, mixed thorium-uranium oxide, mixed uranium-plutonium oxide, $FeO \cdot Cr_2O_3$, $FeO \cdot Fe_2O_3$, and $CaO \cdot TiO_3$, wherein the decomposition is carried out at a temperature between about 650°C and 800°C by means of a mixture consisting of a pyrosulfate selected from the group consisting of alkali metal and ammonium pyrosulfates and a sulfate selected from the group consisting of alkali metal and ammonium sulfates and the quantity of pyrosulfate corresponds at least to the stoichiometric quantity, in order to convert the oxides into sulfates.

2. The process of claim 1, wherein the decomposition takes place by means of an excess of pyrosulfate.

3. The process of claim 1, wherein the excess of pyrosulfate is up to 50 percent of the stoichiometric quantity.

4. The process of claim 1, wherein the escape of reaction gases is reduced.

5. The process of claim 1, wherein the added quantity of sulfate is determined by first decomposing the material which is to be decomposed with pure pyrosulfate and ascertaining in a known manner towards the end of the decomposition the ratio of metal ions to sulfate ions.

6. The process of claim 1, wherein an excess of sulfur trioxide is maintained during the reaction.

* * * * *